United States Patent [19]

Proscia

[11] Patent Number: 5,271,960
[45] Date of Patent: Dec. 21, 1993

[54] STEP GRADIENT ANTI-IRIDESCENT COATINGS

[75] Inventor: James W. Proscia, Dearborn, Mich.

[73] Assignee: Ford Motor Company, Dearborn, Mich.

[21] Appl. No.: 916,641

[22] Filed: Jul. 20, 1992

Related U.S. Application Data

[62] Division of Ser. No. 720,114, Jun. 24, 1991, Pat. No. 5,168,003.

[51] Int. Cl.$^5$ ............................................. B05D 5/06
[52] U.S. Cl. .................................... 427/164; 427/108; 427/109; 427/110; 427/165; 427/166; 427/168; 427/226; 427/419.3
[58] Field of Search ............... 427/108, 109, 162, 164, 427/165, 166, 168, 110, 226, 419.3

[56] References Cited

U.S. PATENT DOCUMENTS

| | | |
|---|---|---|
| 2,758,510 | 8/1956 | Auwarter . |
| 2,932,592 | 4/1960 | Cameron . |
| 3,176,574 | 4/1965 | Socha . |
| 3,378,396 | 4/1968 | Zaromb . |
| 3,990,784 | 11/1976 | Gelber ................. 350/166 |
| 4,187,336 | 2/1980 | Gordon ................ 428/34 |
| 4,261,645 | 4/1981 | Sawamura et al. ....... 350/164 |
| 4,264,133 | 4/1981 | Sakurai ................ 350/164 |
| 4,308,316 | 12/1981 | Gordon ................ 428/336 |
| 4,310,584 | 1/1982 | Cooper et al. .......... 428/212 |
| 4,377,613 | 3/1983 | Gordon ................ 428/212 |
| 4,419,386 | 12/1983 | Gordon ................ 427/109 |
| 4,440,822 | 4/1984 | Gordon ................ 428/216 |
| 4,556,599 | 12/1985 | Sato et al. ............ 428/216 |
| 4,581,280 | 4/1986 | Taguchi et al. ........ 428/212 |
| 4,805,989 | 2/1989 | Nakajima ............. 350/164 |
| 4,966,437 | 10/1990 | Rahn ................. 427/419.3 |

FOREIGN PATENT DOCUMENTS 0348185 12/1989 European Pat. Off. .

OTHER PUBLICATIONS

Hamburg et al., "Evaporated Sn–doped In$_2$O$_3$ Films: Basic Optical Properties and Applications to Energy–Efficient Windows", *J. Appl. Phys.* 60(11), Dec. 1, 1986.
Berning, "Principles of Design of Architectural Coatings", *Applied Optics*, vol. 22, p. 4127, Dec. 15, 1983.
MacLeod, "Thin–Film Optical Filters", Adam Hilger Ltd., London, 1969, pp. 37–43.
Vasicek, A., *Optics of Thin Films*, North-Holland Publishing Company, Amsterdam, 1960.

*Primary Examiner*—Janyce Bell
*Attorney, Agent, or Firm*—Lorraine S. Melotik; Roger L. May

[57] ABSTRACT

Glazing article comprises a substrate bearing a substantially transparent coating comprising an optically functional layer and a thinner anti-iridescence layer undercoat mediate the optically functional layer and the substrate. The anti-iridescence layer eliminates or substantially reduces iridescence and, in addition, is readily designed to make the overall coating colorless or to provide a substantially uniform, muted color. The anti-iridescence layer comprises a high refractive index zone on the substrate, having a refractive index higher than that of the substrate. Multiple gradient step zones are stacked on the high refractive index zone, including a low refractive index zone. A second gradient step zone having a refractive index higher than that of the first gradient step zone is positioned on the low refractive index zone, such that the low refractive index zone is directly sandwiched between the two higher refractive index zones. Anti-iridescence is provided for a wide variety of optically functional layers without significant impairment of the optical performance thereof.

2 Claims, 1 Drawing Sheet

STEP GRADIENT ANTI-IRIDESCENT COATINGS

This application is a division of application Ser. No. 07/720,114, filed on Jun. 24, 1991, now U.S. Pat. No. 5,168,003.

INTRODUCTION

This invention is directed to anti-iridescent coatings particularly suitable for use on glass and other transparent substrates, such as in glazing applications and the like. A multi-zone anti-iridescent layer is provided on a substrate surface beneath an optically functional layer. The invention further provides methods for producing such structures.

BACKGROUND OF THE INVENTION

It is well known that glass and like transparent substrates can be coated with transparent films to provide or alter optical properties, such as transmission, reflection, electrical conductivity, etc. Particularly significant commercial uses for such coatings include, for example, infrared reflection, low-emissivity and solar load reduction, etc. In solar load control applications, for example, such coatings reduce the amount of solar energy in the non-visible wavelengths passing through the glazing panel to reduce an air-conditioning load within a building, motor vehicle, etc. In a low emissivity glazing application, such coatings reduce the heating load of a building in a cold climate by reducing the loss of infrared radiation from the heated interior of the building through the glazing panel. Typically, for example, glass and other transparent materials can be coated with transparent semi-conductor films such as tin oxide, indium oxide or cadmium stannate, in order to reflect infrared radiation. Coatings of these same materials and other materials also conduct electricity, and are employed as resistance heaters to heat windows, particularly in motor vehicles, airplanes, etc. to remove fog and ice.

It is a recognized problem that substrates bearing such coatings may show iridescence, that is, color in reflected light and, to a lesser extent, in transmitted light. Such iridescence is understood to be generally the result of an interference phenomenon wherein certain wavelengths reflected partially at the exterior of the coating are out of phase with light of that wavelength reflected from the interface of the coating with the substrate, while reflected light of other wavelengths is in phase and interferes additively. The degree to which the reflected light of a given wavelength cancels or interferes additively is a function of the wavelength and the optical thickness of the coating.

The iridescence effect typically associated with coatings less than about 1 micron, especially less than about 0.75 microns, is aesthetically unacceptable in many architectural, motor vehicle and other applications. In fact, interference colors most generally occur with coatings in the thickness range of 0.1 to 1.0 micron, a thickness range of significant practical importance in many commercial applications. A large portion of present commercial production of coated glass glazing panels, for example, comprise coatings in the thickness range of about 0.1 to 1.0 micron, which display pronounced iridescent colors, especially in reflected daylight. The presence of iridescence is commonly understood to inhibit the use of more energy efficient coated glass in many glazing applications, despite the fact that the potential energy conservation would make the application cost effective. In addition, lack of thickness uniformity in the coating results in the appearance of multiple colors on a single piece of glass, sometimes referred to as banding, often rendering the glazing unit visually unacceptable.

One known means of reducing visible interference colors from such film coatings on glass or a like substrate is to increase the thickness of the coating to greater than one micron. Thicker coatings, however, are more expensive to make, requiring more reactant and longer deposition times. Furthermore, they have a greater tendency to crack as a result of thermal stress. An alternative means of reducing interference color involves the use of an underlayer coating between the substrate surface and the optically functional coating. For example, a known color suppressing undercoat for a fluorine-doped tin oxide low emissivity coating 3,000 to 4,000 Angstroms thick consists essentially of a Si—O—C interlayer between the glass substrate and the overcoat. The interlayer has a refractive index intermediate that of the substrate and the overcoat and is about 700 Angstroms thick.

In U.S. Pat. No. 4,440,822 to Gordon heat loss by infrared radiation through the glass areas of a heated building is said to be approximately one-half the heat loss through uncoated windows. The presence of iridescent colors on coated glass is said to be a major reason preventing its use. The Gordon '822 patent is directed to transparent glass window structures wherein the glass bears a coating of infrared reflective material with an interlayer of continuously varying refractive index between the glass and the coating. The refractive index of the interlayer is said to increase continuously from a low value at the interface of the interlayer with the substrate to a high value at the interface with the infrared reflective coating. FIG. 5 of that patent, for example, shows an underlayer consisting of tin oxide and silicon oxide wherein the relative proportion of tin and, hence, the refractive index, both increase with distance from the glass surface. The refractive index increases from about 1.5 at the glass surface to about 2.0 at the interface with the thick film coating of infrared reflective material. Reducing color to a low level of iridescence by interposing, between a substrate and a coating, a graded-index layer that varies in refractive index between the values at the two boundaries also is suggested in *Principles of Design of Architectural Coatings*, APPLIED OPTICS, Volume 22, No. 24, pp. 4127–4144 (15 Dec., 1983).

Other approaches have been suggested. In U.S. Pat. No. 4,308,316 to Gordon and in U.S. Pat. No. 4,187,336 to Gordon (a division of Gordon '316) single and double layer undercoats on glass under a thick film coating of tin oxide are taught for reducing iridescence. The one or more layers of transparent material between the glass and the semi-conductor coating are said to have refractive indices intermediate those of the glass and the semi-conductor. The double interlayer taught by these patents involves a first sub-layer closest to the glass having a lower refractive index and a second sub-layer closer to the semi-conductor coating having a relatively higher refractive index, both values being, as stated immediately above, intermediate the refractive index values of the glass and the coating.

In U.S. Pat. Nos. 4,419,386 to Gordon and 4,377,613 to Gordon (a division of Gordon '386) an intermediate layer is placed between a glass substrate and an infrared reflecting coating to reduce iridescence. The interlayer is similar to that disclosed in above mentioned U.S. Pat. No. 4,187,336 to Gordon, except that the order of refractive index is reversed. That is, the sub-layer further from the glass has the lower refractive index while the sub-layer closer to the glass has the higher refractive index. It is claimed that by reversing the order the color suppression is achieved using thinner layers.

The importance of color properties for window coatings is recognized also in *Evaporated Sn-Doped In$_2$O$_3$ Films: Basic Optical Properties and Applications to Energy-Efficient Windows*, J. Appl. Phys. 60 (11) pp. 123-159. Section X.C of that article discusses anti-reflection treatment for significantly decreasing iridescence. It is noted that iridescence has plagued earlier oxide-type window coatings, leading manufacturers to use film thicknesses much larger than those required to obtain a desired low thermal emittance. This is noted to be inefficient in terms of materials utilization and process time. An anti-reflection coating of sputtered aluminum oxyfluoride material is mentioned.

Many such known anti-iridescence undercoats, including some of the undercoats of the Gordon patents, present a haze problem. Specifically, some of the Gordon patents admit that many of the disclosed coatings, when used on ordinary window glass, show considerable haze or scattered light. To remedy this deficiency, Gordon recommends first depositing on the glass substrate surface a layer of low refractive index material such as SiO$_2$. Also suggested for this purpose are Si$_3$N$_4$ and GeO$_2$. In particular, it is asserted that if the initial layer contains large proportions of materials including, for example, SnO$_2$, "then haze formation is likely."

Another difficulty connected with the anti-iridescence undercoats suggested in the Gordon patents and in other teachings is their sensitivity to the thickness of the interlayers. Specifically, the degree of anti-iridescence efficacy depends strongly on depositing the interlayers within precise thickness ranges and with highly uniform thickness. In U.S. Pat. No. 4,187,336, for example, it is suggested that a change of plus or minus 0.02 in the refractive index or a change of plus or minus 10% in the thickness of certain single layer undercoatings would be sufficient to raise the color saturation to observable values. In coated substrate production on an industrial scale, it may be difficult in certain instances to guarantee coating deposition within such narrow ranges. Certain double interlayer systems are suggested by Gordon to have broader permissible thickness variations. Coating systems tolerant of film thickness variations are commercially and economically desirable.

It is an object of the present invention to provide a substantially transparent glazing article having a coating with an anti-iridescence layer which is, at least in certain preferred embodiments of the invention, tolerant of deviations in its parameters, specifically, deviations in the thickness and refractive index of both the anti-iridescence interlayer and the optically functional coating (low emissivity coating, solar load control coating, etc.). In particular, it is an object of the invention to provide a substantially transparent glazing article and a method of producing the same which are robust in their industrial implementation. Specifically, it is an object of the invention to provide such glazing article wherein at least certain preferred embodiments have product and manufacturing process specifications with tolerance ranges readily achievable using presently available manufacturing techniques and equipment. These and other objects of the present invention will be better understood from the following disclosure and description thereof.

SUMMARY OF THE INVENTION

According to a first aspect of the present invention, a glazing article comprises a glass or other substantially transparent substrate having a coated surface, specifically, at least an area of a surface of the substrate carries a substantially transparent coating comprising a layer adapted to provide optical functionality, such as low emissivity solar load control, electrical conductivity, infrared and ultraviolet reflectivity, etc. Such optically functional layer may consist of a single homogenous film or may comprise a film stack, depending on the optical function(s) to be performed. In either case, iridescence otherwise present is overcome by an anti-iridescence layer which is less thick than the optically functional top layer. The anti-iridescence layer comprises a high refractive index zone directly on the substrate surface, having a higher refractive index than the substrate. The anti-iridescence layer further comprises multiple gradient step zones stacked directly over the high refractive index zone. The refractive index of the high refractive index zone and of each of the gradient index zones is substantially constant with distance from the substrate surface. In each gradient step zone the refractive index is higher than the refractive index of the gradient step zone next closer to the substrate surface. The first gradient step zone, the one directly over the high refractive index zone, has a refractive index lower than that of the high refractive index zone. Thus, the anti-iridescence layer comprises a low refractive index zone (comprising at least the first gradient step zone) sandwiched between the high refractive index zone and a second high refractive index zone (comprising at least the second gradient step zone).

A second aspect of the invention is directed to a method of producing the substantially transparent glazing article disclosed immediately above. Specifically, such method comprises depositing the high refractive index zone on the substantially transparent substrate, followed by the gradient step zones and then the optically functional layer. As discussed and described further below, certain preferred embodiments of the invention involve performing the aforesaid deposition by means of pyrolytic deposition techniques.

The present invention is a significant advance in the art of coated glazing articles for a number of reasons. Most notably, it provides in certain preferred embodiments a product and a method of producing such product which are tolerant of naturally occurring variations in film thicknesses both in the optically functional layer and in the anti-iridescence layer, film thickness uniformity, refractive index values, and the like. The substantially transparent glazing articles of preferred embodiments of the invention have little or no visible iridescence, yet provide desired optical properties such as, for example, low emissivity, visible transparency, infrared reflectivity, ultra-violet reflectivity and/or electrical conductivity. The anti-iridescence layer of the present invention is compatible with many commercially significant coatings employed to provide such optical properties. In accordance with certain preferred embodiments, a single, uniform, muted perceptible color or a colorless appearance is provided. In addition, such advantages are achieved in many preferred embodiments of the invention with little or no production cost increase over the cost of prior known anti-iridescent films. This is achieved in that the present invention allows, in certain preferred embodiments, simplified process control, reduced material usage, less expensive materials and/or shorter production time. It should be noted in this regard, that it is a significant advantage of the present invention that the anti-iridescence undercoat of preferred embodiments is effective in providing a colorless appearance over a broad thickness range for many optically functional overcoats. It will also be appreciated by those skilled in this industrial area that the invention can provide these features and advantages employing well-known and readily commercially available production equipment and materials. In addition, while not wishing to be bound by theory, the performance of such preferred embodiments is understood to be improved by sodium suppression provided by the anti-iridescence layer. Moreover, some or all of the above advantages can be achieved in accordance with certain preferred embodiments of the invention through the use of a continuous process which is fully compatible with manufacturing processes presently used in the coated glass industry. Presently available optics predictions programs, versions of which are commercially available and well-known to those skilled in the coated glass industry, can be readily employed to identify optimal thicknesses and refractive indexes for the various zones of the anti-iridescence layer of the invention.

It is a highly significant feature of the anti-iridescence layer of the glazing article of the present invention that a low refractive index zone is sandwiched between high refractive index zones. While not wishing to be bound by theory, significant advantages of the invention are believed to result at least partly from this key feature. Notably, its industrial robustness, that is, its tolerance of parameter variations, such as film thickness, refractive index etc., is believed due at least partly to this high-/low/high refractive index sandwiching feature.

Additional advantages and features of the invention will be better understood from the detailed description of certain preferred embodiments set forth below, taken in conjunction with the accompanying drawings.

It should be recognized that the drawings are not to scale and film thicknesses are greatly exaggerated with respect to the glass substrate for clarity of illustration and ease of understanding the drawings.

DETAILED DESCRIPTION OF PREFERRED EMBODIMENTS

It should be understood that occasional reference herein to the optically functional layer as a "top coat" or the like, is for ease of discussion and understanding, especially taken in conjunction with the drawings wherein the optically functional layer is illustrated as a mono-film in a "top" position. It is not intended, however, to limit the optically functional layer to one exposed to the atmosphere or otherwise necessarily occupying a "top" position. Thus, for example, in certain embodiments of the invention additional layers, for example protective layers, may cover the optically functional layer. In other embodiments the coated surface may be laminated to a second ply of the glazing article.

Anti-iridescence undercoats of the present invention are applicable both to provide a colorless appearance for a coated substrate, and, in the alternative, to provide a single, substantially uniform, muted, perceptible color in the glazing article. Based on the present disclosure, selection of refractive indices and film thicknesses to achieve one or the other of these results, along with determining other optical features and properties of the finished product can be readily determined empirically by those skilled in the art or, for example, by employing a commercially available optics prediction software program. Such programs, typically run on commercially available computer systems, are well known to greatly facilitate close approximation of an optimized final commercial product. Typically, a graphic presentation of the optical properties of a given glazing article, sorted by individual layer thickness and refractive index, can be used to determine the regions of optimum film stack design. In particular, such graphic representation can assist in readily identifying industrially robust film stack designs of the present invention. That is, designs in which performance is tolerant of variations in film thickness, refractive index and other parameters normal during industrial production of coated glazing articles.

Figure 1:
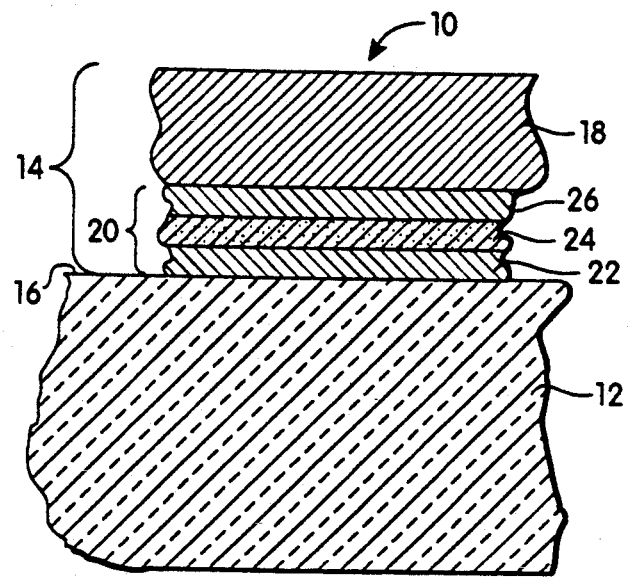
FIG. 1 is a cross-sectional view of a substantially transparent glazing article, partially broken away, in accordance with a preferred embodiment of the present invention, in which a substantially transparent coating is formed on a surface of a glass substrate.

Referring specifically to FIG. 1, a substantially transparent glazing article 10 is seen to comprise a glass substrate 12 having coating 14 carried on its upper surface 16. The glass substrate 12 preferably is soda-lime glass having a refractive index of about 1.5. The glazing article may, for example, be adapted for use in an architectural glazing application or the like. Those skilled in the art will recognize that substrates alternative to glass will be suitable, although certain methods of forming coating 14, such as pyrolytic deposition, may be unsuitable for certain alternative substrate materials, for example, certain plastic substrates. The coating 14 comprises an optically functional layer 18 having a higher refractive index than the substrate. Layer 18 is exposed to the atmosphere. According to the preferred embodiment of FIG. 1, the coating provides optical functionality including low emissivity and infrared and ultraviolet reflectivity. Preferably, optically functional layer 18 is about 2,000 to 10,000 Angstroms thick. More preferably the optically functional layer is about 2,000 to 5,000 Angstroms thick, most preferably about 3,500 to 4,000 Angstroms thick, having an average refractive index (over the visible wavelength range) of about 1.7 to 2.5, more preferably about 1.9 to 2.1, most preferably about 1.9 (measured at 550 nm wavelength). Such preferred materials for the optically functional layer 18 include, for example, tin oxide, fluorine doped tin oxide and other metal oxides of suitable refractive index. According to a most preferred embodiment, layer 18 consists essentially of fluorine doped tin oxide having a refractive index (average) of 1.9. In such embodiment layer 18 is substantially transparent, that is, it is substantially transparent (within the context of its intended use) to visible light. It also provides infrared reflectivity and ultraviolet reflectivity for solar load control. In addition, it has good electrical conductivity and could be used, therefore, for applications including electrical resistance heating, etc. The high/low/high refractive index sandwiching feature of the invention is especially effective in use under an optically functional layer consisting of fluorinated tin oxide in certain distinct thickness ranges: 2500–3000 Angstroms, 3500–4000 Angstroms and 4800–5200 Angstroms. Tolerance to thickness variations is especially good for fluorinated tin oxide in the first two ranges. Approximately the same preferred thickness ranges apply to unfluorinated tin oxide. In general, the terms "tin oxide" and "$SnO_2$," as used hereinafter, mean both fluorinated and unfluorinated tin oxide, unless otherwise specified. Such preferred embodiments of the invention are particularly advantageous for use in insulated glazing units and like applications. Insulated glazing units include those with multiple panes having an air gap between adjacent panes. In a two pane glazing unit, taking the outside surface of the outer pane as the No. 1 surface, its inside surface (i.e., the surface facing the air gap) as the No. 2 surface, the outside surface of the inner pane (again, facing the air gap) as surface No. 3, and the inside surface of the inner pane as the No. 4 surface, a coating of the invention according to such preferred embodiments would preferably be on the No. 3 surface in a colder climate (such as Northern U.S.) and on the No. 2 surface in a warmer climate (such as Southern U.S.). In a triple glazed unit, the coating preferably is on the No. 2 surface in a warmer climate and on the No. 5 surface (the air gap side of the innermost pane) in a colder climate.

According to another highly preferred embodiment of the invention, glazing article 10 is adapted for architectural glazing purposes and the coating 14 is a low emissivity coating in which layer 18 consists essentially of fluorinated tin oxide, having a thickness between about 3,500 and 4,000 Angstroms. In conjunction with the preferred anti-iridescence layer described below, the resulting glazing article is substantially colorless in both reflected and transmitted light. That is, the visible iridescence which would otherwise be shown by such glazing article is eliminated without substantially impairing the optical properties of the coating. Specifically, the low emissivity property of the tin oxide or fluorine-doped tin oxide layer is not significantly reduced or impeded by the anti-iridescence layer.

It is a significant advantage of preferred embodiments of the invention that anti-iridescence is achieved with such thin optically functional films. As noted above, certain prior art teaching has recommended the use of thicker films to avoid iridescence, although this involves several disadvantages, including a greater tendency toward thermal stress cracking, longer (and, hence, more costly) deposition periods, greater loss of transparency, etc.

It will be recognized by those skilled in the art in view of the present disclosure that numerous alternative optically functional layers can be employed in lieu of, or together with, the tin oxide layer 18 of the above discussed preferred embodiment of the invention. Particularly advantageous alternative materials include, for example, zinc oxide, titanium oxide, indium tin oxide, antimony doped tin oxide, and tungsten oxide. The optically functional layer 18 also may be a composite of multiple films and may not be exposed to the atmosphere, as noted above. Thus, for example, the aforesaid low emissivity film may be provided with an overcoating of protective material, such as silicon dioxide, etc. Those skilled in the art will recognize innumerable additional and alternative films which may be used together with the main film of the optically functional layer 18 including adjunct films such as, for example, abrasion resistant films, color imparting films, and the like. With respect to coating 14 not being exposed to the atmosphere, it may be positioned at an interface between laminated plies of a glazing article. Alternatively, it may be employed on an inside surface of a transparent substrate used in a double glazing article, such that the coating is exposed to a vacuum or air gap between two spaced plies.

Coating 14 further comprises anti-iridescence layer 20 which substantially eliminates the visible iridescence which would otherwise show, particularly in viewing sunlight reflected from the coated surface. The anti-iridescence layer 20 eliminates visible iridescence while not significantly impairing the optically functional film's desirable properties discussed above, including most notably its visible transparency, infrared reflectivity, ultraviolet reflectivity and low emissivity. Layer 20 is less thick than the optically functional layer 18, preferably being about 400 to 1,300 Angstroms thick, more preferably about 700 to 1,000 Angstroms. In the preferred embodiment of FIG. 1, it consists essentially of a low refractive index zone sandwiched between two high refractive index zones. High refractive index zone 22 is deposited directly on surface 16 of glass substrate 12. It should be understood that description of a layer or zone as being deposited "directly" on or over another surface or another layer is intended to mean that it forms an interface with such layer or surface without any other layer of zone intervening between them. In the preferred embodiment illustrated, anti-iridescence layer 20 is positioned directly on surface 16 and directly under layer 18. As used herein, this is intended to mean there is no thin film coating or the like mediate the anti-iridescence layer 20 and the substrate 12. Thus, surface 16 is a surface of the bulk material of substrate 12, rather than of some other coating material deposited onto substrate 12 prior to deposition of coating 14. Similarly, anti-iridescence layer 20 is positioned directly under optically functional layer 18 in the sense that there is no mediate film or coating between them.

High refractive index zone 22 preferably is about 100 to 500 Angstroms thick, more preferably 100 to 300 Angstroms thick. It is a significant feature of the embodiment of FIG. 1, in accordance with general principles of the invention discussed above, that first zone 22 has a refractive index higher than that of the substrate 12. For a substrate of soda-lime glass or other material having a refractive index about 1.5, the refractive index of zone 22 is higher than that of glass substrate 12. The refractive index of zone 22 preferably is between about 1.6 and 2.5, more preferably 1.9 to 2.1, most preferably about 1.9. Suitable materials for high refractive index zone 22 are readily commercially available and will be apparent to those skilled in the art in view of the present disclosure. Tin oxide, having a refractive index of 1.9, is most preferred for zone 22 in the above mentioned low emissivity embodiment of the invention employing a glass substrate 12 and a tin oxide (optionally fluorinated) optically functional layer 18. Suitable materials for high refractive index zone 22 are listed in Table A below

TABLE A

| Coating Materials with High Refractive Index | | |
|---|---|---|
| Material | Formula | Refractive Index |
| tin oxide | $SnO_2$ | 1.9 |
| silicon nitride | $Si_3N_4$ | 2.0 |
| silicon monoxide | SiO | about 2.0 |
| zinc oxide | ZnO | 2.0 |
| indium oxide | $In_2O_3$ | 2.0 |
| vanadium oxide | $V_2O_5$ | about 2.0 |
| tungsten oxide | $WO_3$ | about 2.0 |
| niobium oxide | $Nb_2O_5$ | 2.1 |
| tantalum oxide | $Ta_2O_5$ | 2.1 |
| zirconium oxide | $ZrO_2$ | 2.1 |
| cerium oxide | $CeO_2$ | 2.2 |
| zinc sulfide | ZnS | 2.3 |
| titanium oxide | $TiO_2$ | 2.5 |

In the preferred embodiment of the invention illustrated in FIG. 1, a first gradient step zone above high refractive index zone 22 is low refractive index zone 24 positioned directly on high refractive index zone 22. A second gradient step zone, high refractive index zone 26, is positioned directly on low refractive index zone 24, directly under optically functional film 18. Thus, low refractive index zone 24 is sandwiched between higher refractive index zones 22 and 26. Zones 24 and 26 together preferably have a thickness in the range of about 300 to 800 Angstroms. In the preferred embodiment illustrated in FIG. 1, each of zones 24 and 26 most preferably is about 100 to 400 Angstroms thick. The refractive index of low refractive index zone 24 preferably is between about 1.0 and 1.9, more preferably between about 1.4 and 1.7. It need only be sufficiently below that of high refractive index zone 22 to establish an optically functional refractive index gradient step. Thus, in the preferred low emissivity embodiment referred to above, it need only be sufficiently below the refractive index 1.9 of the tin oxide preferably used in zone 22. Preferably, however, the refractive index of zone 24 also is lower than that of the substrate. This is found to provide in the finished product excellent anti-iridescence functionality even with the extremely thin zone thicknesses recited above. In the preferred low emissivity embodiment referred to above, low refractive index zone 24 consists essentially of silicon dioxide, $SiO_2$, having a refractive index of about 1.44. Alternative materials are readily commercially available and will be apparent to those skilled in the art in view of the present disclosure. Materials suitable for low refractive index zone 24 are listed in Table B below.

TABLE B

| Coating Materials with Low Refractive Index | | |
|---|---|---|
| Material | Formula | Refractive Index |
| aluminum oxide | $Al_2O_3$ | 1.65 |
| silicon dioxide | $SiO_2$ | 1.44 |
| silicone polymer | $[(CH_3)_2SiO]_n$ | 1.4 |
| magnesium fluoride | $MgF_2$ | 1.38 |
| cryolite | $Na_3AlF_6$ | 1.33 |

The change in the value of the refractive index from each gradient step zone to the next should be at least about 0.1, more preferably at least about 0.2. In addition, the step must involve a zone or film thickness sufficient to function as a substantially discrete film. Preferably, each such step or change involves a film thickness of at least about 100 Angstroms. Those skilled in the art will recognize that all industrial deposition methods involve the creation of a region of some thickness wherein the change from one zone to the next occurs. The change or step in the context of the present invention from one gradient step zone to the next is sufficiently sharp, taking the refractive index change in conjunction with the thickness of the film, that the optical properties of a substantially discrete refractive index step (either from high to low or low to high, as the case may be) is achieved.

Preferably, the refractive index of zone 26 is between about 1.55 and 1.75. Most preferably it is about 1.65. Suitable materials for high refractive index zone 26 are readily commercially available and will be apparent to those skilled in the art in view of the present disclosure. According to the highly preferred low emissivity embodiment referred to above, having a glass substrate and employing tin oxide for layer 14 and zone 22, zone 24 is about 100 to 400 Angstroms consisting essentially of silicon dioxide having a refractive index of about 1.44, and zone 26 is about 100 to 400 Angstroms consisting essentially of either aluminum oxide, $Al_2O_3$, or an homogenous composition of silicon dioxide and tin dioxide, $SiO_2/SnO_2$, having a refractive index of about 1.65. Additional suitable materials include, for example, blends of materials listed in Table A and Table B, above. It will be apparent to those skilled in the art in view of the present disclosure that if a material having a relatively higher refractive index is employed for the low refractive index film, i.e., the first gradient step zone, such as aluminum oxide having a refractive index of about 1.65, then a material having an even higher refractive index must, of course, be selected for zone 26. It will be appreciated from the above description that in at least one preferred embodiment of the invention, as illustrated in FIG. 1, all layers of coating 14 are formed of tin oxide, silicon dioxide, or a mixture of the two. Significant processing advantage can be achieved employing so few materials in the formation of the coating.

Several processes for forming the coatings of the present invention are readily commercially available and are well known to those skilled in the art. Preferred processes for depositing the anti-iridescence layer 20 and the optically functional layer 18, include, for example, vacuum sputtering, sol-gel, and pyrolytic deposition, including spray pyrolysis and chemical vapor deposition. It should be recognized that the refractive index of the materials employed in the layers of the coating of the present invention may vary slightly depending on the method used in their deposition.

Figure 2:
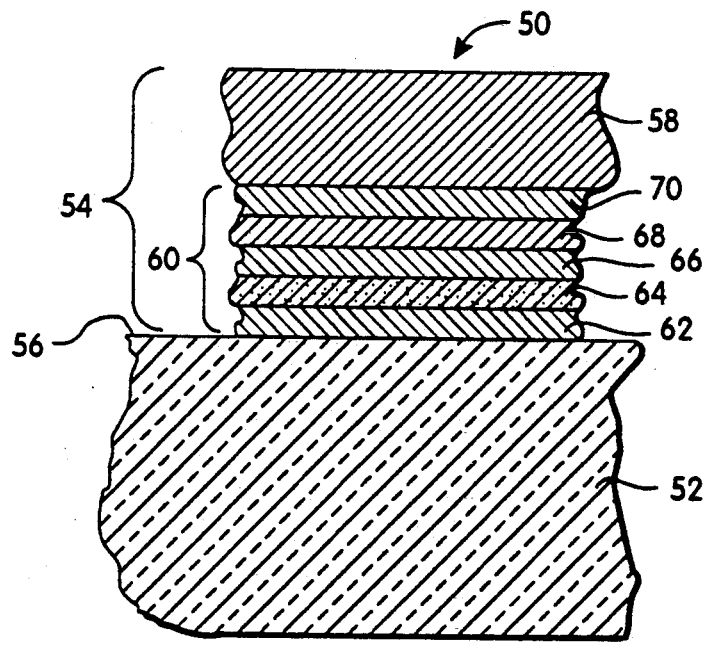
FIG. 2 is a cross-sectional view of a second preferred embodiment of the invention.

Referring now to FIG. 2, a second preferred embodiment of the invention is illustrated. Specifically, substantially transparent glazing article 50 comprises a substantially transparent glass substrate 52. Substantially transparent coating 54 is carried on surface 56 of glass substrate 52. The coating 54 comprises an optically functional layer 58 exposed to the atmosphere and an anti-iridescence layer 60 mediate the substrate 52 and the optically functional layer 58. As in the case of the embodiment of FIG. 1, the anti-iridescence layer 60 can be employed to eliminate visible iridescence from the thin film coating, resulting in either a colorless appearance or providing a single, substantially uniform, muted, slightly perceptible color. In either case, the anti-iridescence layer performs such function without substantially impeding or preventing the desirable optical properties of the optically functional layer 58, including visible transparency, infrared reflectivity, ultraviolet reflectivity, low emissivity, and/or electrical conductivity, depending on the particular optically functional layer employed in the coating. Preferably the optically functional layer 58 is a low emissivity layer of tin oxide or the like having a thickness of about 0.7 microns. According to certain preferred embodiments, coating 54 is a substantially transparent, low emissivity coating wherein optically functional layer 58 is about 2,000 to 10,000 Angstroms thick, more preferably between about 2,000 and 5,000, most preferably between about 3,500 and 4,000 Angstroms thick, having a refractive index (over the visible wavelength range) between about 1.7 and 2.5, most preferably about 1.9 (measured at 550 nm wavelength). Suitable materials for layer 58 include those described above for optically functional layer 18 of the embodiment of FIG. 1. Most preferred is a tin oxide layer having a refractive index of about 1.9 and a substantially uniform thickness of about 3,500 to 4,000 Angstroms.

Layer 60 in the embodiment of FIG. 2 consists essentially of a high refractive index zone 62 directly on surface 56 of glass substrate 52 followed by four gradient step zones. Layer 60 is less thick than low emissivity layer 58. The refractive index of zone 62 is higher than that of the substrate 52, preferably being between about 1.6 and 2.5, most preferably being about 1.9. Materials described above for high refractive index zone 22 in the embodiment of FIG. 1 are suitable also for high refractive index zone 62 in the embodiment of FIG. 2. The preferred thickness of high refractive index zone 62 is between about 100 and 500 Angstroms, more preferably between about 100 and 300 Angstroms. Tin oxide is highly preferred for zone 62 in view of its high refractive index of about 1.9, its transparency, ease of uniform deposition, environmental stability, and compatibility with other preferred materials of the glazing article.

A first gradient step zone, low refractive index zone 64, is deposited directly on high refractive index zone 62. Suitable materials for low refractive index zone 64 include those described above for low refractive index zone 24 of the embodiment of FIG. 1. Preferably zone 64 has a refractive index between about 1.0 and 1.9, more preferably between 1.4 and 1.5, most preferably being about 1.44. The thickness of zone 64 preferably is between about 100 and 400 Angstroms. Most preferred is a layer of silicon dioxide having a refractive index of about 1.44 and a substantially uniform thickness between about 100 and 400 Angstroms.

Low refractive index zone 64 is sandwiched directly between high refractive index zone 62 and a second high refractive index zone, second step gradient zone 66. The second high refractive index zone in the embodiment of FIG. 2 is followed by two additional gradient step zones 68 and 70, each having a refractive index higher than the preceding zone. Specifically, zone 66 is deposited directly on low refractive index zone 64 and has a refractive index higher than that of zone 64. Thus, in the preferred embodiment wherein low refractive index zone 64 has a refractive index of about 1.44, zone 66 has a refractive index between about 1.5 and 1.6, most preferably having a refractive index of about 1.55. Suitable materials for zone 66 include any of numerous blends of materials from Table A and Table B above. Preferably the thickness of sub-zone 66 is between about 100 and 400 Angstroms in thickness.

The next gradient step zone, zone 68, is deposited directly on zone 66 and has a refractive index higher than that of zone 66. Preferably, the refractive index of zone 68 is between about 1.6 and 1.7, most preferably being about 1.65. The thickness of sub-zone 66 is preferably between about 100 and 400 Angstroms. Suitable materials include those recited above for second high refractive index zone 26 of the embodiment of FIG. 1, including aluminum oxide and a blend of silicon dioxide and tin oxide, the latter being preferred in view of its ease of deposition, transparency, compatibility with other materials in the preferred embodiment, and commonality of materials.

Finally, the last gradient step zone, zone 70, is deposited directly on zone 68 and is directly under optically functional layer 58. It has a refractive index higher than zone 68 and lower than layer 58, preferably being between about 1.7 and 1.8, most preferably being about 1.75. Suitable materials are readily commercially available and will be apparent to those skilled in the art in view of the present disclosure. Preferred materials include blends of materials listed in Table A and Table B, above.

As in the case of the embodiment of FIG. 1, coating 54 can be formed by any of various commercially known and used deposition methods, including sputtering, spray pyrolysis, sol-gel, and chemical vapor deposition. The following example illustrates production of a preferred embodiment of the invention.

EXAMPLE 1

Soda-lime float glass is heated to about 600° C. in a laboratory belt furnace. A gaseous mixture consisting of 7.0% difluoroethane, 0.4% water, 0.4% tin tetrachloride and the balance nitrogen is passed over the heated glass resulting in deposition of a tin oxide film approximately 270 Angstroms thick. The tin tetrachloride and water vapor are kept separated until just prior to reaction. A second film of silicon dioxide is deposited over the tin oxide film by passing a gaseous mixture consisting of 0.4% silane, 60% oxygen and the balance nitrogen over the heated glass. The second film is approximately 140 Angstroms thick. A third film of aluminum oxide is formed by passing a gaseous mixture of 0.1% diethylaluminum chloride, 10% nitrous oxide and the balance nitrogen over the heated glass. The reactants are kept separate until just prior to reaction. The thickness of this layer is approximately 170 Angstroms. A thick layer of tin oxide, approximately 3,500 Angstroms thick, is formed by passing a gaseous mixture over the glass which has the same composition as the gaseous mixture used for the first tin oxide film. The resulting product has a color purity of about 3% and an infrared emissivity of about 0.2.

It will be understood by those skilled in the art in view of the present disclosure that the foregoing discussion of certain preferred embodiments is intended for purposes of illustration, rather than limitation. Various modifications will be readily apparent in view of the present disclosure and the following claims are intended to cover the full scope of the invention, including all such apparent modifications.

I claim:

1. A method of making a substantially transparent glazing article comprising deposition of a substantially transparent coating on a surface of a substantially transparent substrate, the coating comprising an optically functional layer and an anti-iridescence layer between the substrate surface and the optically functional layer, said deposition comprising the steps of:

first depositing the anti-iridescence layer by depositing a high refractive index zone directly on the substrate surface, the high refractive index zone having a refractive index higher than that of the substrate, then depositing multiple gradient step zones directly over the high refractive index zone, including at least a first gradient step zone having a substantially constant refractive index lower than that of the high refractive index zone, and a second gradient step zone directly over the first gradient step zone having a substantially constant refractive index higher than that of the first gradient step zone; and then depositing the optically functional layer directly over the anti-iridescence layer, optically functional layer being 2,000 to 10,000 Angstroms thick and having a refractive index greater than the refractive index of any of said multiple gradient step zones.

2. The method of claim 1 wherein each said deposition is by pyrolytic deposition.

* * * * *